(12) United States Patent
Zeng (10) Patent No.: US 11,269,705 B2
(45) Date of Patent: Mar. 8, 2022

(54) METHOD AND APPARATUS FOR OUTPUTTING INFORMATION

(71) Applicant: BEIJING BAIDU NETCOM SCIENCE AND TECHNOLOGY CO., LTD., Beijing (CN)

(72) Inventor: Guowei Zeng, Beijing (CN)

(73) Assignee: BEIJING BAIDU NETCOM SCIENCE AND TECHNOLOGV CO., LTD., Beijing (CN)

(*) Notice: Subject to any disclaimer, the term of this patent is extended or adjusted under 35 U.S.C. 154(b) by 145 days.

(21) Appl. No.: 16/505,296

(22) Filed: Jul. 8, 2019

(65) Prior Publication Data

US 2020/0097355 A1    Mar. 26, 2020

(30) Foreign Application Priority Data

Sep. 26, 2018 (CN) .......................... 201811123463.1

(51) Int. Cl.
*G06F 11/00* (2006.01)
*G06F 11/07* (2006.01)

(52) U.S. Cl.
CPC ........ *G06F 11/0772* (2013.01); *G06F 11/079* (2013.01); *G06F 11/0727* (2013.01); *G06F 11/0751* (2013.01)

(58) Field of Classification Search
CPC ............. G06F 11/0772; G06F 11/0727; G06F 11/0751; G06F 11/079; G06F 11/0709
See application file for complete search history.

(56) References Cited

U.S. PATENT DOCUMENTS 10,203,890 B1* 2/2019 Lathia ................. G06F 11/2092
2011/0283028 A1 11/2011 Byers et al.
(Continued)

FOREIGN PATENT DOCUMENTS

CN    103064860 A    4/2013
CN    106453297 A    2/2017
(Continued)

OTHER PUBLICATIONS

Penton, Loren, "Oracle GoldenGate: Integrated Heartbeat," A-Team Chronicles, Dec. 18, 2017, 11 pages.
(Continued)

*Primary Examiner* — Philip Guyton
(74) *Attorney, Agent, or Firm* — Seed IP Law Group LLP (57) ABSTRACT

Embodiments of the present disclosure disclose a method and apparatus for outputting information. A specific embodiment of the method comprises: connecting a database, in response to receiving a request for detecting the database; performing a write operation on a heartbeat table in the database, in response to detecting the connection with the database being normal; performing a read operation on the heartbeat table in the database, in response to detecting the write operation for the heartbeat table being abnormal; performing on the database an operation of writing a file to a hard disk, in response to detecting the read operation on the heartbeat table being normal; and outputting first information for representing a cause of a database failure, in response to detecting the operation of writing the file to the hard disk being abnormal. This embodiment improves the accuracy of the detection on the database failure.

15 Claims, 8 Drawing Sheets

(56) References Cited

U.S. PATENT DOCUMENTS

| | | | |
|---|---|---|---|
| 2015/0113340 A1* | 4/2015 | Gao | G06F 11/0709 |
| | | | 714/55 |
| 2015/0142967 A1 | 5/2015 | Lockhart et al. | |
| 2018/0225344 A1* | 8/2018 | Fang | G06F 21/62 |

FOREIGN PATENT DOCUMENTS

| | | |
|---|---|---|
| CN | 106815094 A | 6/2017 |
| CN | 108319617 A | 7/2018 |

OTHER PUBLICATIONS

Zhao et al., "Database disaster recovery system," Railway Information Technology, vol. 26, No. 10, Oct. 2017, pp. 17-20.

\* cited by examiner

METHOD AND APPARATUS FOR OUTPUTTING INFORMATION

CROSS-REFERENCE TO RELATED APPLICATIONS

This application claims priority to Chinese Patent Application No. 201811123463.1, filed with the China National Intellectual Property Administration (CNIPA) on Sep. 26, 2018, the content of which is incorporated herein by reference in its entirety.

TECHNICAL FIELD

Embodiments of the present disclosure relate to the field of computer technology, and specifically to a method and apparatus for outputting information.

BACKGROUND

A relational database typically provides storage services using a cluster mode of a master-slave architecture. Since write requests for businesses are all sent to a master database, once the master database fails, the Recovery Time Objective (RTO) of the services is affected and a loss to the business is directly caused. A failure perception, as a prerequisite for a high availability of a service, needs to meet diverse and complex actual environments. A misinterpretation or a missed interpretation occurs easily in the failure perception, which will affect the Recovery Time Objective (RTO) of the service. Accordingly, a quick, accurate and automatic perception on the failure of the master database is in demand.

Traditional approaches to determine whether the master database is alive includes: (1) Whether the database is alive is determined through a check on whether the port is alive. In this case, in the situations such as that a machine is suspended, an instance of the database is suspended, or a disk fails, the port is alive and an actual failure is difficult to be determined. (2) Whether the database is alive is determined by accessing the database or sending to the database a request. By monitoring similar semantics, this determination is more accurate, but the database is easily misinterpreted as abnormal in the situation where the database is under a large pressure. These two determination approaches are relatively simple, but are difficult to be applied to actually complicated application scenarios.

SUMMARY

Embodiments of the present disclosure propose a method and apparatus for outputting information.

In a first aspect, the embodiments of the present disclosure provide a method for outputting information. The method includes: connecting a database, in response to receiving a request for detecting the database; performing a write operation on a heartbeat table in the database, in response to detecting the connection with the database being normal; performing a read operation on the heartbeat table in the database, in response to detecting the write operation for the heartbeat table being abnormal; performing on the database an operation of writing a file to a hard disk, in response to detecting the read operation on the heartbeat table being normal; and outputting first information for representing a cause of a database failure, in response to detecting the operation of writing the file to the hard disk being abnormal.

In some embodiments, the method further includes: determining, in response to detecting the connection with the database being abnormal, whether a number of connections with the database is greater than a predetermined threshold; performing on the database the operation of writing the file to the hard disk in response to the number of connections being greater than the predetermined threshold; and outputting the first information, in response to detecting the operation of writing the file to the hard disk being abnormal.

In some embodiments, the method further includes: outputting second information for representing a cause of the database failure in response to the number of connections being less than the predetermined threshold.

In some embodiments, the method further includes: outputting, in response to detecting the read operation on the heartbeat table being abnormal, third information for representing a cause of the database failure.

In some embodiments, the method further includes: acquiring master-slave synchronization status information of at least one slave database connecting with the database; and outputting fourth information for representing a cause of the database failure, in response to master-slave connections of slave databases exceeding a first predetermined ratio in the at least one database being interrupted being determined based on the master-slave synchronization status information.

In some embodiments, the outputting fourth information for representing a cause of the database failure, in response to master-slave connections of slave databases exceeding a first predetermined ratio in the at least one database being interrupted being determined based on the master-slave synchronization status information includes: sending, in response to master-slave connections of some slave databases in the at least one database being uninterrupted being determined based on the master-slave synchronization status information, a request for re-establishing a connection to a slave database having an uninterrupted master-slave connection in the at least one slave database; and outputting the fourth information, in response to detecting that abnormal re-established connections in the slave databases having the uninterrupted master-slave connections exceeds a second predetermined ratio.

In some embodiments, the method further includes: acquiring, in response to detecting the database failure, switching time of a previous database switching operation and a surplus capacity of a candidate database; and performing a database switching operation, in response to determining a difference between current time and the switching time being greater than or equal to a predetermined time interval threshold and the surplus capacity of the candidate database being greater than or equal to a used capacity of the database.

In some embodiments, the performing a database switching operation includes: sending switching indication information to an administrator terminal of the database; and switching, in response to receiving switching confirmation information fed back by the administrator terminal, data in the database to the candidate database.

In a second aspect, the embodiments of the present disclosure provide an apparatus for outputting information. The apparatus includes: a connecting unit, configured to connect a database, in response to receiving a request for detecting the database; a heartbeat writing unit, configured to perform a write operation on a heartbeat table in the database, in response to detecting the connection with the database being normal; a heartbeat reading unit, configured to perform a read operation on the heartbeat table in the database, in response to detecting the write operation for the heartbeat table being abnormal; a file writing unit, configured to perform on the database an operation of writing a file to a hard disk, in response to detecting the read operation for the heartbeat table being normal; and a first detecting unit, configured to output first information for representing a cause of a database failure, in response to detecting the operation of writing the file to the hard disk being abnormal.

In some embodiments, the apparatus further includes a second detecting unit. The second detecting unit is configured to: determine, in response to detecting the connection with the database being abnormal, whether a number of connections with the database is greater than a predetermined threshold; perform on the database the operation of writing the file to the hard disk in response to the number of connections being greater than the predetermined threshold; and output the first information, in response to detecting the operation of writing the file to the hard disk being abnormal.

In some embodiments, the second detecting unit is further configured to: output second information for representing a cause of the database failure in response to the number of connections being less than the predetermined threshold.

In some embodiments, the apparatus further includes a third detecting unit. The third detecting unit is configured to: output, in response to detecting the read operation on the heartbeat table being abnormal, third information for representing a cause of the database failure.

In some embodiments, the apparatus further includes a fourth detecting unit. The fourth detecting unit is configured to: acquire master-slave synchronization status information of at least one slave database connecting with the database; and output fourth information for representing a cause of the database failure, in response to master-slave connections of slave databases exceeding a first predetermined ratio in the at least one database being interrupted being determined based on the master-slave synchronization status information.

In some embodiments, the fourth detecting unit is further configured to: send, in response to master-slave connections of some slave databases in the at least one database being uninterrupted being determined based on the master-slave synchronization status information, a request for re-establishing a connection to a slave database having an uninterrupted master-slave connection in the at least one slave database; and output the fourth information, in response to detecting that abnormal re-established connections in the slave databases having the uninterrupted master-slave connections being abnormal exceeds a second predetermined ration.

In some embodiments, the apparatus further includes a switching unit. The switching unit is configured to: acquire, in response to detecting the database failure, switching time of a previous database switching operation and a surplus capacity of a candidate database; and perform a database switching operation, in response to determining a difference between current time and the switching time being greater than or equal to a predetermined time interval threshold and the surplus capacity of the candidate database being greater than or equal to a used capacity of the database.

In some embodiments, the switching unit is further configured to: send switching indication information to an administrator terminal of the database; and switch, in response to receiving switching confirmation information fed back by the administrator terminal, data in the database to the candidate database.

In a third aspect, the embodiments of the present disclosure provide an electronic device. The electronic device includes: one or more processors; and a storage device, configured to store one or more programs. The one or more programs, when executed by the one or more processors, cause the one or more processors to implement the method in any of the embodiments in the first aspect.

In a fourth aspect, the embodiments of the present disclosure provide a computer readable medium storing a computer program. The program, when executed by a processor, implements the method in any of the embodiments in the first aspect.

According to the method and apparatus for outputting information provided by the embodiments of the present disclosure, whether the database failure occurs is detected by performing operations such as a connection operation, a read or write operation, a hard disk operation. Therefore, various kinds of operational information of the database is effectively utilized, thus improving the accuracy of the detection on the database failure.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
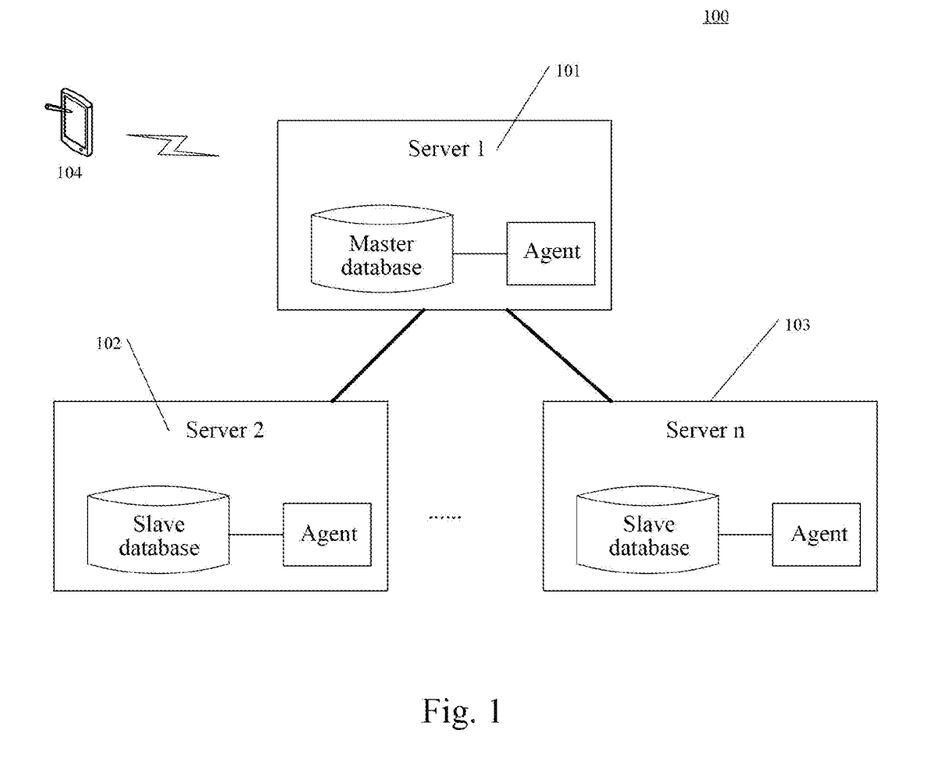
FIG. 1 is a diagram of an exemplary system architecture in which embodiments of the present disclosure may be applied.

FIG. 1 shows an exemplary system architecture 100 in which embodiments of a method for outputting information or an apparatus for outputting information according to the present disclosure may be applied.

As shown in FIG. 1, the system architecture 100 may include servers 101, 102 and 103, a network, and a terminal device 104. The servers includes a database and an agent. Here, the database includes a master database and a slave database. The network serves as a medium providing a communication link between the servers 101, 102 and 103 and the terminal device 104. The network may include various types of connections, for example, wired or wireless communication links, or optical fiber cables.

A user may use the terminal device 104 to interact with the servers 101, 102 and 103 via the network, to receive or send messages. Various communication client applications (e.g., web browser applications, shopping applications, search applications, instant communication tools, mailbox clients or social platform software) may be installed on the terminal device 104.

The terminal device 104 may be hardware or software. When being the hardware, the terminal device 104 may be various electronic devices having a display screen, which include, but not limited to, a smart phone, a tablet computer, an e-book reader, an MP3 player (Moving Picture Experts Group Audio Layer III), an MP4 (Moving Picture Experts Group Audio Layer IV) player, a laptop portable computer, a desktop computer, etc. When being the software, the terminal device 104 may be installed in the above listed electronic devices. The terminal device may be implemented as a plurality of pieces of software or a plurality of software modules (e.g., software or software modules for providing a distributed database service), or as a single piece of software or a single software module, which will not be specifically defined here.

The user may interact with the database using the agent, to receive or send messages. The agent may be connected to the database, and then may perform a failure detection on the database. An interaction may further be performed between databases via the network, and the master database may switch data to the slave database.

A server may be a server providing various services, for example, a backend database server providing a support for a network business. The backend database server may process (e.g., analyze) data such as a received webpage page request, and feed the processing result (e.g., webpage page data) back to the terminal device.

It should be noted that the servers may be hardware or software. When being the hardware, the servers may be implemented as a distributed server cluster composed of a plurality of servers, or as a single server. When being the software, the servers may be implemented as a plurality of pieces of software or a plurality of software modules (e.g., software or software modules for providing a distributed service), or as a single piece of software or a single software module, which will not be specifically defined here.

It should be noted that the method for outputting information provided by the embodiments of the present disclosure is generally performed by the servers. Correspondingly, the apparatus for outputting information is generally provided in the servers.

It should be appreciated that the numbers of the terminal devices, the networks, and the servers in FIG. 1 are merely illustrative. Any number of terminal devices, networks, and servers may be provided based on actual requirements.

Figure 2:
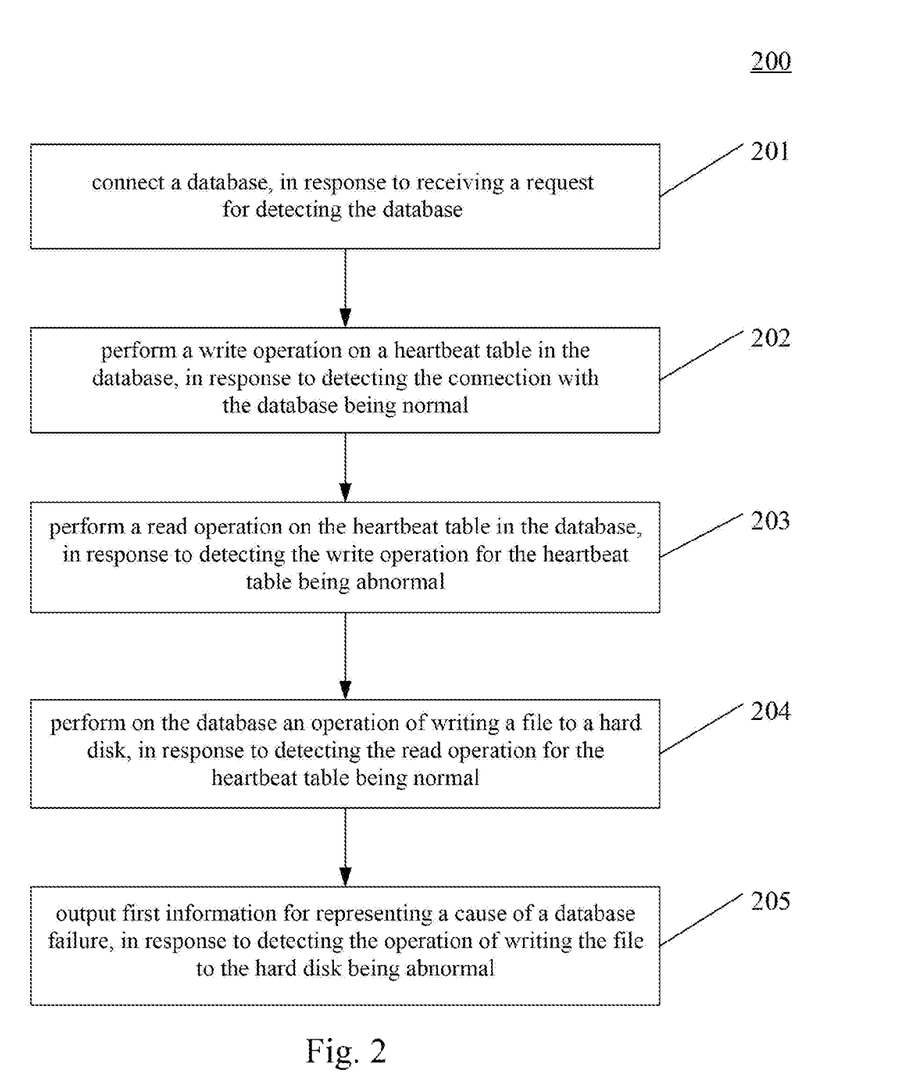
FIG. 2 is a flowchart of an embodiment of a method for outputting information according to the present disclosure.

Further referring to FIG. 2, FIG. 2 illustrates a flow 200 of an embodiment of a method for outputting information according to the present disclosure. The method for outputting information includes the following steps:

Step 201, connecting a database in response to receiving a request for detecting the database.

In this embodiment, by means of a wired connection or a wireless connection, an executing body (e.g., the servers shown in FIG. 1) of the method for outputting information may receive the request for detecting the database from a terminal with which the user performs a database detection. The database may be in the executing body or in another server. The database may be connected locally or remotely. The database may be a relational database such as MySQL.

Step 202, performing a write operation on a heartbeat table in the database, in response to detecting the connection with the database being normal.

In this embodiment, if it is detected that the connection with the database is normal, the write operation on the heartbeat table in the database is performed. The heartbeat table refers to a common data table in the database that is specifically used to detect a memory status. During implementations of the present disclosure, the content of the heartbeat table does not need to be concerned, but only whether the write is successful needs to be concerned.

In some alternative implementations of this embodiment, if the connection is abnormal, a warning prompt is generated. If the warning information refers to that the number of connections is too large, the failure detection is further performed on the hard disk, to determine whether the database is under excessive pressure due to a failure of the hard disk.

In some alternative implementations of this embodiment, if the abnormal connection is not caused by the excessive connections, the abnormal cause causing the warning prompt is outputted as second information.

Step 203, performing a read operation on the heartbeat table in the database, in response to detecting the write operation on the heartbeat table being abnormal.

In this embodiment, if the write operation on the heartbeat table fails, it is required to further verify that a memory operation is abnormal through the read operation on the heartbeat table. If the read operation on the heartbeat table and the write operation on the heartbeat table are both abnormal, it indicates that the memory operation is abnormal. It is normal even if the read heartbeat table is empty.

Step 204, performing on the database an operation of writing a file to a hard disk, in response to detecting the read operation on the heartbeat table being normal.

In this embodiment, if the write operation on the heartbeat table is abnormal while the read operation on the heartbeat table is normal, it indicates that the database failure is not caused by an abnormal memory operation, and it is required to further detect the hard disk. The detection is performed by writing a file into the hard disk, and the content of the file is not limited.

In some alternative implementations of this embodiment, if the write operation on the heartbeat table is abnormal and the read operation on the heartbeat table is abnormal, it indicates that the memory operation is abnormal. That is, the cause of the database failure is a memory failure. The memory failure is outputted as third information of the cause of the database failure.

Step 205, outputting first information for representing a cause of a database failure, in response to detecting the operation of writing the file into the hard disk being abnormal.

In this embodiment, if the write operation on the heartbeat table is abnormal, the read operation on the heartbeat table is normal, and the operation of the hard disk is abnormal, it indicates that the database failure is caused by a hard disk failure. The hard disk failure is indicated in the outputted first information.

Figure 3:
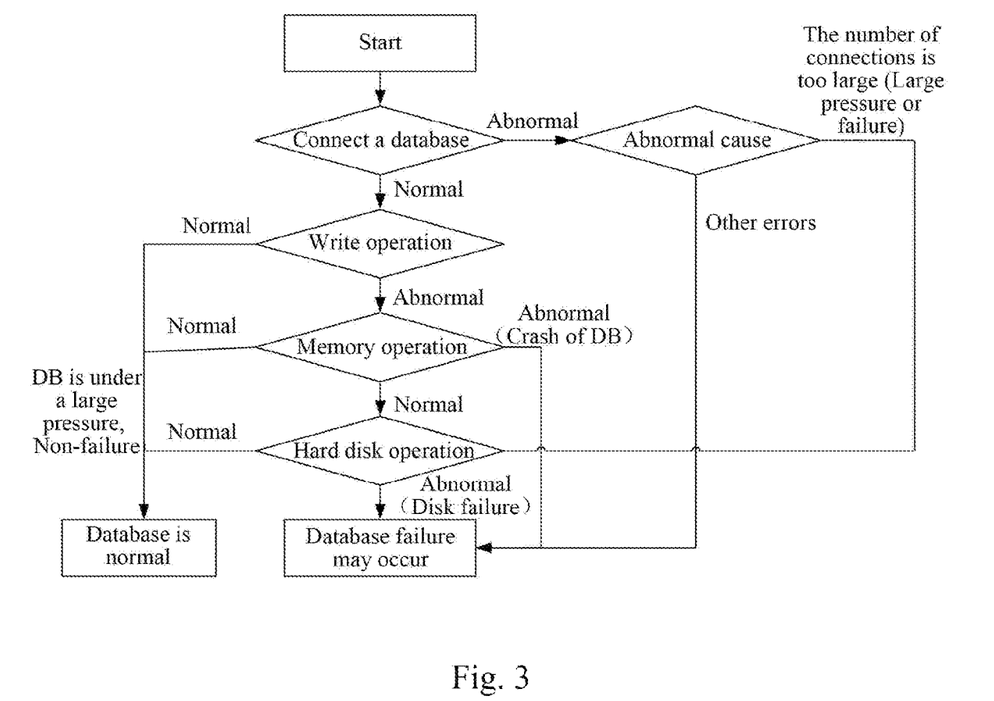
FIG. 3 is a schematic diagram of an application scenario of the method for outputting information according to the present disclosure.

Further referring to FIG. 3, FIG. 3 is a schematic diagram of an application scenario of the method for outputting information according to the present disclosure. In the application scenario of FIG. 3, the user inspects the MySQL and a machine service of a native machine through an instance Agent of a server, and the Agent periodically performs a routine inspection. The approach of the inspection refers to that the Agent of a master database connects the database, to perform a request to write on a heartbeat table in the database. If the write request is performed successfully, it is considered that the master database is normal.

An additional judgment needs to be performed if the following situations happen:

1. The connection with the database is abnormal: if the connection is abnormal and the number of non-connections is too large, it is considered that the DB (database) failure may occur; if the number of connections is too large, it is required to further judge whether the request for the database is blocked and cannot be processed because of a hardware problem such as the failure of the hard disk in the machine, at this point, it is considered that the database is abnormal; otherwise, the situation is deemed to be caused by abnormal business traffic rather than database failure.

2. An operation of writing the database on the database is abnormal: this situation may be caused by the database failure or the hard disk failure, or may be caused by the large pressure over the database, and thus, additional judgment needs to be further performed.

3. Judgment on a machine hardware failure: the judgment is mainly divided into a judgment on the memory failure and a judgment on the hard disk failure: the abnormality of the memory operation is judged when the request to write the database is abnormal, and is generally judged through the situation of reading the heartbeat table. The abnormality of the hard disk operation is judged through the operation of writing the file to the hard disk.

In summary, database failure is deemed occurs in the following situations: (1) the connection to the database is abnormal, and the number of non-connections is too large; (2) the number of the connections to the database is too large, and the hard disk failure occurs; (3) the connection to the database is normal, the read operation and the write operation are abnormal; and (4) the connection to the database is normal, the write operation is abnormal, the read operation is normal, but a disk failure occurs. The failure judgment approaches can comprehensively determine database abnormalities such as the database failure and the machine failure, and that a false judgment on the failure would not occur due to a large pressure over a cluster.

According to the method provided in the above embodiment of the present disclosure, whether a master database failure or a slave database failure occurs is detected by performing the read/write operation and the hard disk operation on the database, thus improving the accuracy of the detection on the database failure.

Figure 4:
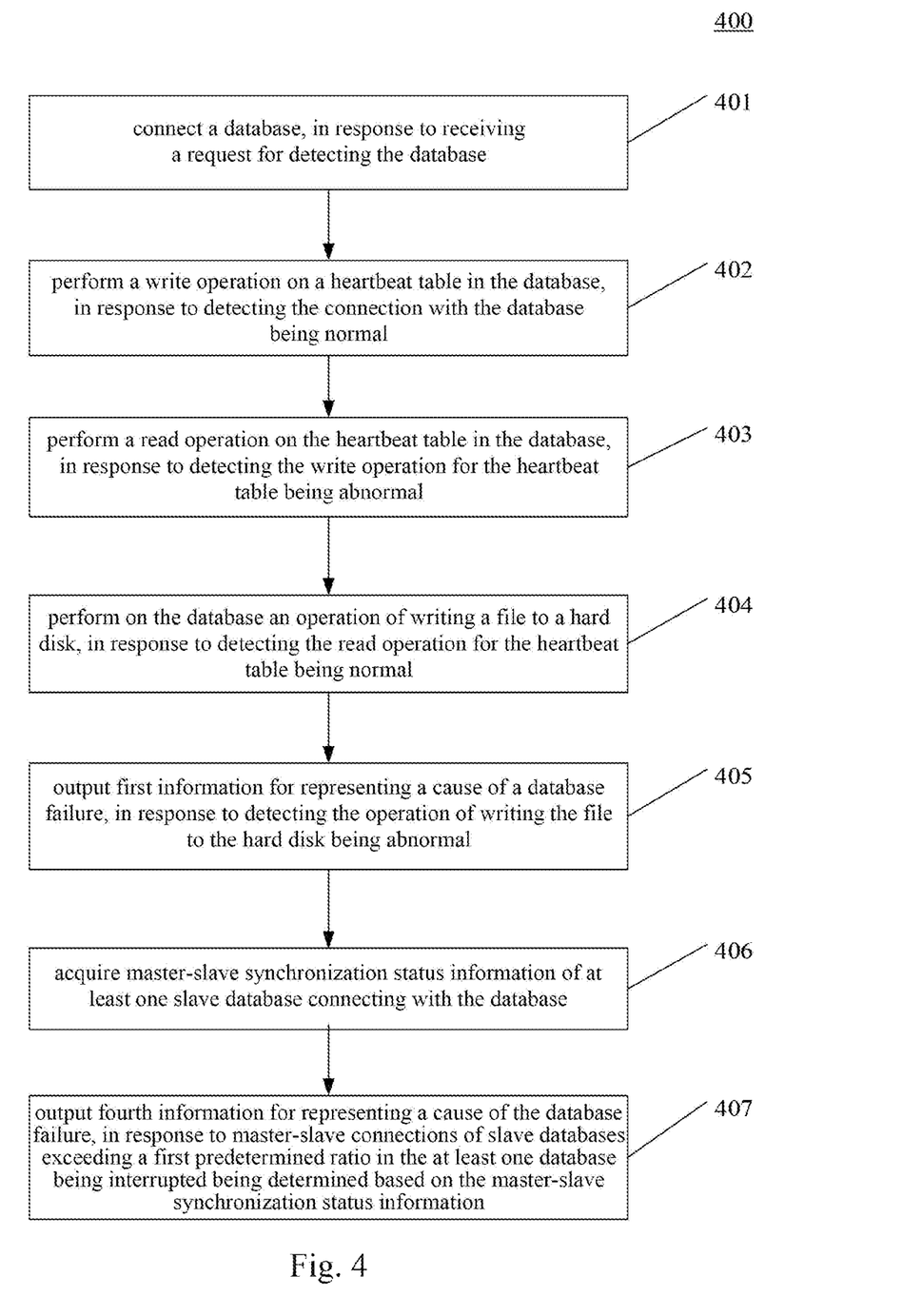
FIG. 4 is a flowchart of another embodiment of the method for outputting information according to the present disclosure.

Further referring to FIG. 4, FIG. 4 illustrates a flow 400 of another embodiment of the method for outputting information. The flow 400 of the method for outputting information includes the following steps:

Step 401, connecting a database, in response to receiving a request for detecting the database.

Step 402, performing a write operation on a heartbeat table in the database, in response to detecting the connection with the database being normal Step 403, performing a read operation on the heartbeat table in the database, in response to detecting the write operation for the heartbeat table being abnormal.

Step 404, performing on the database an operation of writing a file to a hard disk, in response to detecting the read operation on the heartbeat table being normal.

Step 405, outputting first information for representing a cause of a database failure, in response to detecting the operation of writing the file to the hard disk being abnormal.

Steps 401-405 are substantially the same as steps 201-205, which will not be repeatedly described here.

Step 406, acquiring master-slave synchronization status information of at least one slave database connecting with the database.

In this embodiment, insteps 401-405, whether the database failure occurs is detected from the perspective of a single instance. In the present disclosure, whether the database failure occurs may be alternatively detected by combining a plurality of instances. Whether a master base (short for master database) is abnormal is judged through the master-slave synchronization status of a slave base (short for slave database), which is triggered in the following situations: (1) after the failure is determined through the single instance, a second verification is performed; (2) a failure of the Agent of the single instance (e.g., a crash of the machine or a network failure) occurs; and (3) the status of the master base cannot be acquired (network isolation and the like). Whether the master base is abnormal may be detected through a combined judgment on the status of the slave database. For example, through the MySQL database instruction "SHOW SLAVE STATUS," the master-slave synchronization status information of the slave base of the database may be acquired. The master-slave synchronization status information includes an identification indicating whether the master-slave connection is interrupted.

Step 407, outputting fourth information for representing a cause of the database failure, in response to master-slave connections of slave databases exceeding a first predetermined ratio in the at least one database being interrupted being determined based on the master-slave synchronization status information.

In this embodiment, the first predetermined ratio may be 100%. That is, all the master-slave connections are interrupted. The first predetermined ratio may alternatively be a large predetermined value such as 99%. If the master-slave connections of all the slave bases are interrupted (the status of an IO (input output) thread is No), the master base is considered to be failed.

In some alternative implementations of this embodiment, in response to master-slave connections of some slave databases in the at least one database being uninterrupted being determined based on the master-slave synchronization status information, A request for re-establishing a connection is sent to slave database with an uninterrupted master-slave connection in the at least one slave database. The fourth information is outputted in response to that the abnormal re-established connections in the slave databases having the uninterrupted master-slave connection being abnormal exceeds a second predetermined ratio. If in all the master-slave connections of the master base, some of master-slave connections are interrupted while some of the connections are normal, it cannot be simply considered that the master base is alive. Since the connections are still normal in the situations such as the master base machine is suspended, the MySQL is suspended, or the master-slave synchronization process hangs, a differentiation needs to be further performed. The second predetermined ratio may be the same as or different from the first predetermined ratio.

In the situation where there is a normal master-slave connection of a slave base, the judgment may be performed by re-establishing the connection between the slave base and the master base using a synchronized account. If the connection re-establishment fails, the master base is deemed to be failed.

Figure 5:
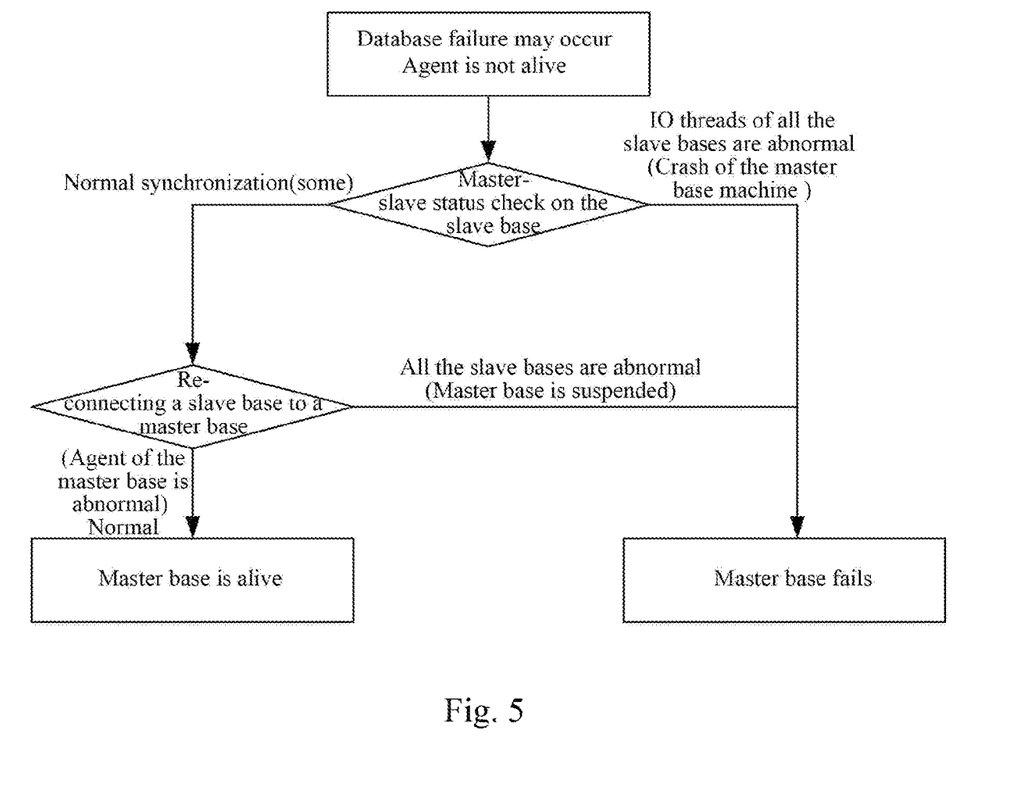
FIG. 5 is a schematic diagram of another application scenario of the method for outputting information according to the present disclosure.

Therefore, as shown in FIG. 5, the strategy for determining whether the master base fails through the combination of slave bases refers to: (1) all the master-slave synchronization statuses of the master base are abnormal; (2) there is a slave base having a normal master-slave synchronization status, but the connection established between the slave base and the master base using a synchronized account cannot be retried.

It may be seen from FIG. 4 that, as compared with FIG. 2, the flow 400 of the method for outputting information in this embodiment reflects a second verification on the database failure, and provides a supplement to the situation where the failure cannot be detected through the single instance. Thus, the accuracy of the detection on the database failure is improved.

Figure 6:
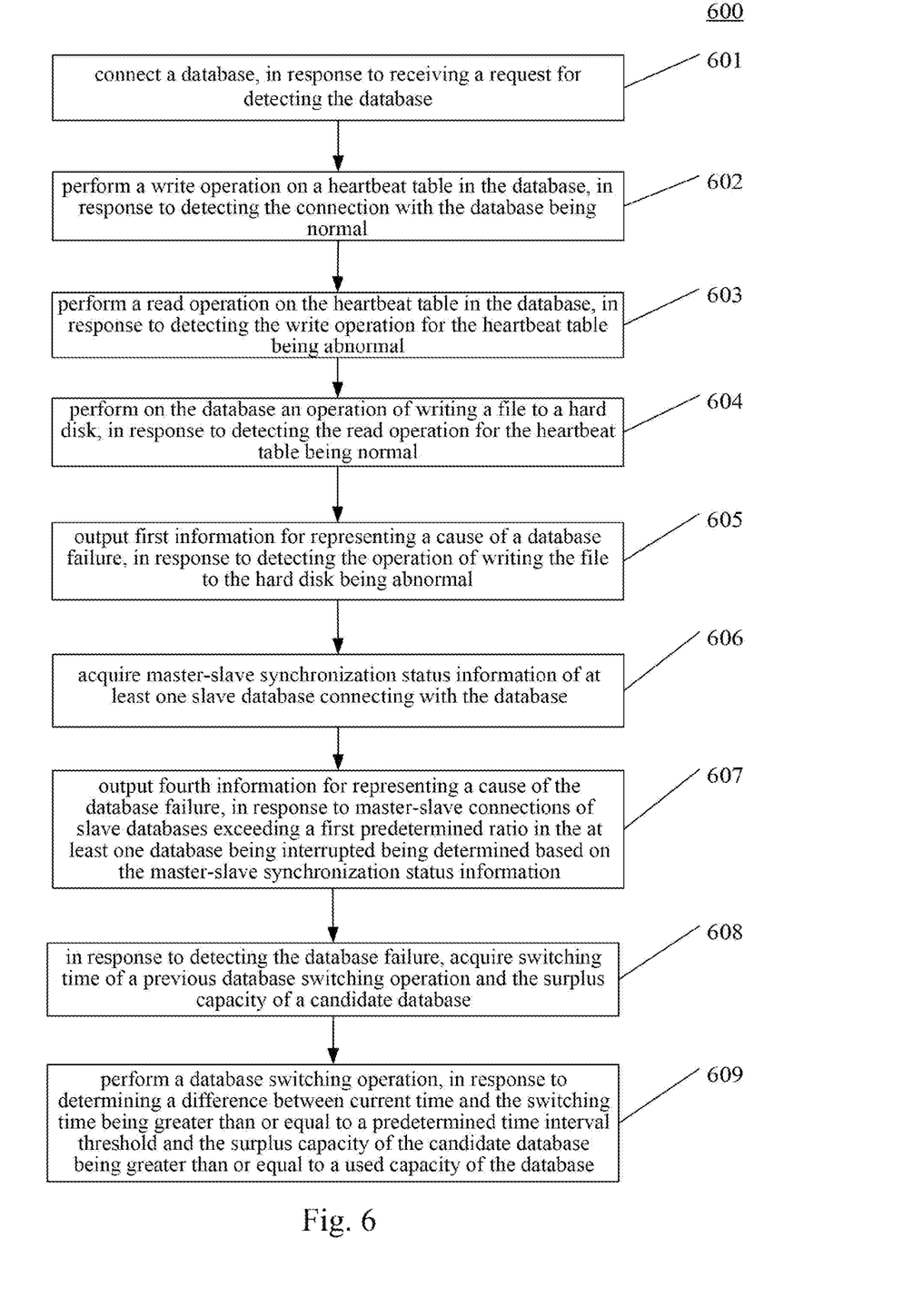
FIG. 6 is a flowchart of another embodiment of the method for outputting information according to the present disclosure.

Further referring to FIG. 6, FIG. 6 illustrates a flow 600 of still another embodiment of the method for outputting information. The flow 600 of the method for outputting information includes the following steps:

Step 601, connecting a database, in response to receiving a request for detecting the database.

Step 602, performing a write operation on a heartbeat table in the database, in response to detecting the connection with the database being normal.

Step 603, performing a read operation on the heartbeat table in the database, in response to detecting the write operation for the heartbeat table being abnormal.

Step 604, performing on the database an operation of writing a file to a hard disk, in response to detecting the read operation on the heartbeat table being normal.

Step 605, outputting first information for representing a cause of a database failure, in response to detecting the operation of writing the file to the hard disk being abnormal.

Step 606, acquiring master-slave synchronization status information of at least one slave database connecting with the database.

Step 607, outputting fourth information for representing a cause of the database failure, in response to master-slave connections of slave databases exceeding a first predetermined ratio in the at least one database being interrupted being determined based on the master-slave synchronization status information.

Steps 601-607 are substantially the same as steps 401-407, which will not be repeatedly described here.

Step 608, acquiring, in response to detecting the database failure, switching time of a previous database switching operation and a surplus capacity of a candidate database.

In this embodiment, if a master database failure is detected, data switching may be performed. The candidate database is a slave database of the master database. In order to avoid frequent switching, it is required to consider the previous switching time. In order to avoid a switching failure, it is required to consider the bearing capability of the database.

Step 609, performing a database switching operation, in response to determining a difference between current time and the switching time being greater than or equal to a predetermined time interval threshold and the surplus capacity of the candidate database being greater than or equal to a used capacity of the database.

In this embodiment, when the database failure is detected, the time from the previous switching to the current time is first determined before the switching. If the database failure is caused by a network failure or a business pressure, and the database cannot be recovered in a short time, the master base still cannot bear the pressure after the switching. In addition, the bearing capability of the slave database needs to be further considered when the switching is performed. If the available capacity is not enough to bear the pressure of the master base, the switching is not performed.

Figure 7:
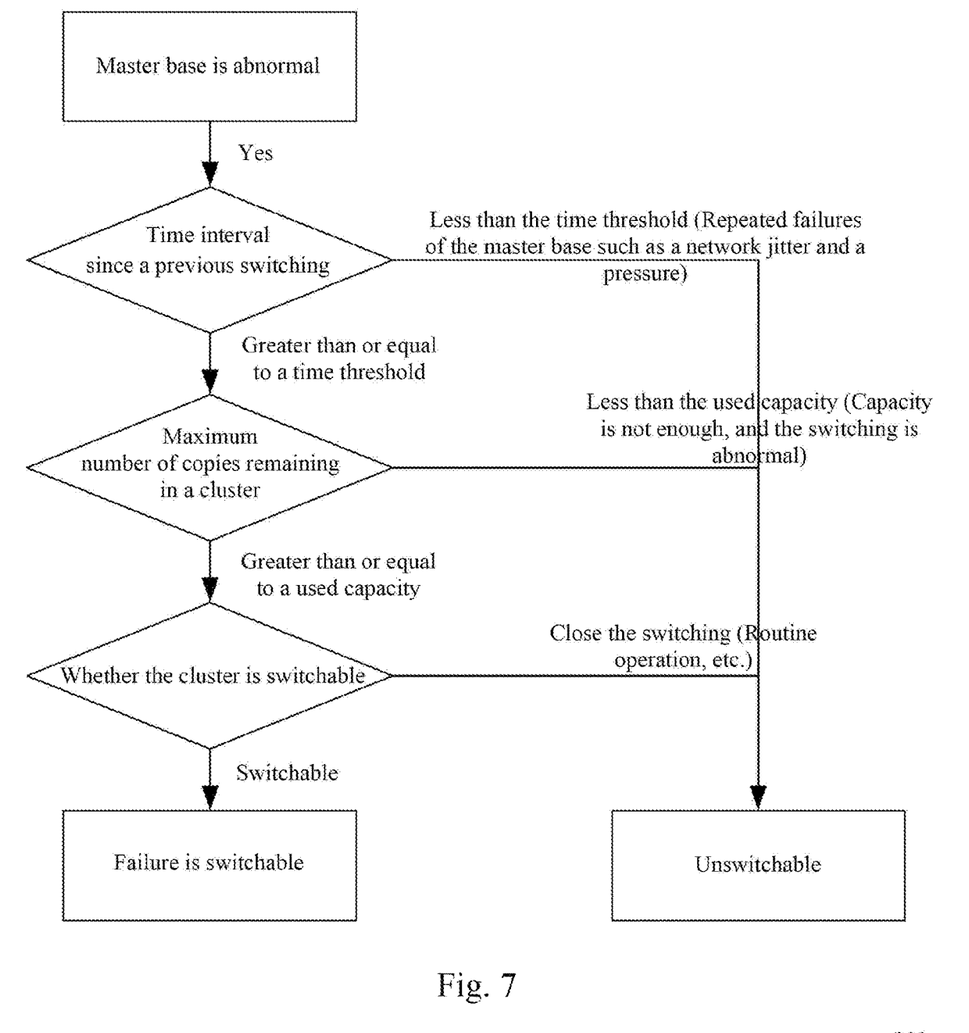
FIG. 7 is a schematic diagram of another application scenario of the method for outputting information according to the present disclosure.

When the failure of the master base in the database cluster is detected, it is usually not necessary to perform the switching immediately, but is required to consider the failure history of the cluster, the current pressure of the cluster, and so on. The specifically considered scenario is as shown in FIG. 7:

(1) A minimum time interval between two failure switching operations: in the scenario of network failure or the scenario of abnormal business pressure, even if the cluster failure is percept and the switching is completed, the new master base may still continue being suspended or even the avalanche of the entire cluster is caused, and thus there is no master base available.

In this case, the minimum time interval between two switching operations may be set. If the time between two switching operations is less than the minimum time interval, the switching is not performed. Otherwise, the switching is allowed.

(2) A maximum number of copies remaining in the cluster: after certain clusters are switched, the capacity of the cluster may not be able to bear the business read and write pressure. At this point, the switching does not mean anything. At this point, whether the switching should be performed may be analyzed by judging whether the maximum number is less than minimum number of copies after the switching is completed.

(3) Whether the cluster is switchable: in some special cases, there may be a database cluster that does not desire to perform failure hosting, or desires a person in charge to perform a second confirmation before the switching. At this point, the check and the judgment are further performed.

Figure 8:
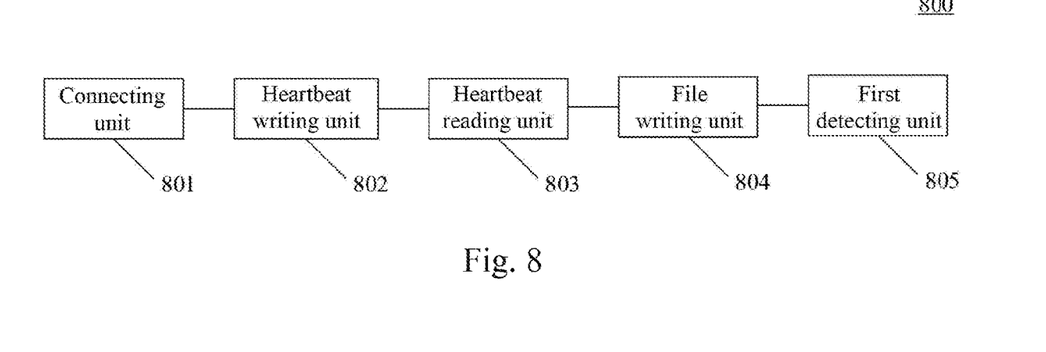
FIG. 8 is a schematic structural diagram of an embodiment of an apparatus for outputting information according to the present disclosure.

Further referring to FIG. 8, as an implementation of the method shown in the above drawings, the present disclosure provides an embodiment of an apparatus for outputting information. The embodiment of the apparatus corresponds to the embodiment of the method shown in FIG. 2, and the apparatus may be applied in various electronic devices.

As shown in FIG. 8, the apparatus 800 for outputting information in this embodiment includes: a connecting unit 801, a heartbeat writing unit 802, a heartbeat reading unit 803, a file writing unit 804 and a first detecting unit 805. Here, the connecting unit 801 is configured to connect a database, in response to receiving a request for detecting the database. The heartbeat writing unit 802 is configured to perform a write operation on a heartbeat table in the database, in response to detecting the connection with the database being normal. The heartbeat reading unit 803 is configured to perform a read operation on the heartbeat table in the database, in response to detecting the write operation for the heartbeat table being abnormal. The file writing unit 804 is configured to perform on the database an operation of writing a file to a hard disk, in response to detecting the read operation for the heartbeat table being normal. The first detecting unit is configured to output first information for representing a cause of a database failure, in response to detecting the operation of writing the file to the hard disk being abnormal.

In this embodiment, for specific processes of the connecting unit 801, the heartbeat writing unit 802, the heartbeat reading unit 803, the file writing unit 804 and the first detecting unit 805 in the apparatus 800 for outputting information, reference may be made to relative descriptions of step 201, step 202, step 203, step 204 and step 205 in the corresponding embodiment of FIG. 2 respectively.

In some alternative implementations of this embodiment, the apparatus 800 further includes a second detecting unit (not shown). The second detecting unit is configured to: determine, in response to detecting the connection with the database being abnormal, whether a number of connections with the database is greater than a predetermined threshold; perform on the database the operation of writing the file to the hard disk in response to the number of connections being greater than the predetermined threshold; and output the first information, in response to detecting the operation of writing the file to the hard disk being abnormal.

In some alternative implementations of this embodiment, the second detecting unit is further configured to: output second information for representing a cause of the database failure in response to the number of connections being less than the predetermined threshold.

In some alternative implementations of this embodiment, the apparatus 800 further includes a third detecting unit (not shown). The third detecting unit is configured to: output, in response to detecting the read operation on the heartbeat table being abnormal.

In some alternative implementations of this embodiment, the apparatus 800 further includes a fourth detecting unit (not shown). The fourth detecting unit is configured to: acquire master-slave synchronization status information of at least one slave database connecting with the database; and output fourth information for representing a cause of the database failure, in response to master-slave connections of slave databases exceeding a first predetermined ratio in the at least one database being interrupted being determined based on the master-slave synchronization status information.

In some alternative implementations of this embodiment, the fourth detecting unit is further configured to: send, in response to master-slave connections of some slave databases in the at least one database being uninterrupted being determined based on the master-slave synchronization status information, a request for re-establishing a connection to a slave database having an uninterrupted master-slave connection in the at least one slave database; and output the fourth information, in response to that abnormal re-established connections in the slave databases having the uninterrupted master-slave connections exceeds a second predetermined ratio being inspected.

In some alternative implementations of this embodiment, the apparatus 800 further includes a switching unit. The switching unit is configured to: acquire, in response to detecting the database failure, switching time of a previous database switching operation and a surplus capacity of a candidate database; and perform a database switching operation, in response to determining a difference between current time and the switching time being greater than or equal to a predetermined time interval threshold and the surplus capacity of the candidate database being greater than or equal to a used capacity of the database.

In some alternative implementations of this embodiment, the switching unit is further configured to: send switching indication information to an administrator terminal of the database; and switch, in response to receiving switching confirmation information fed back by the administrator terminal, data in the database to the candidate database.

Figure 9:
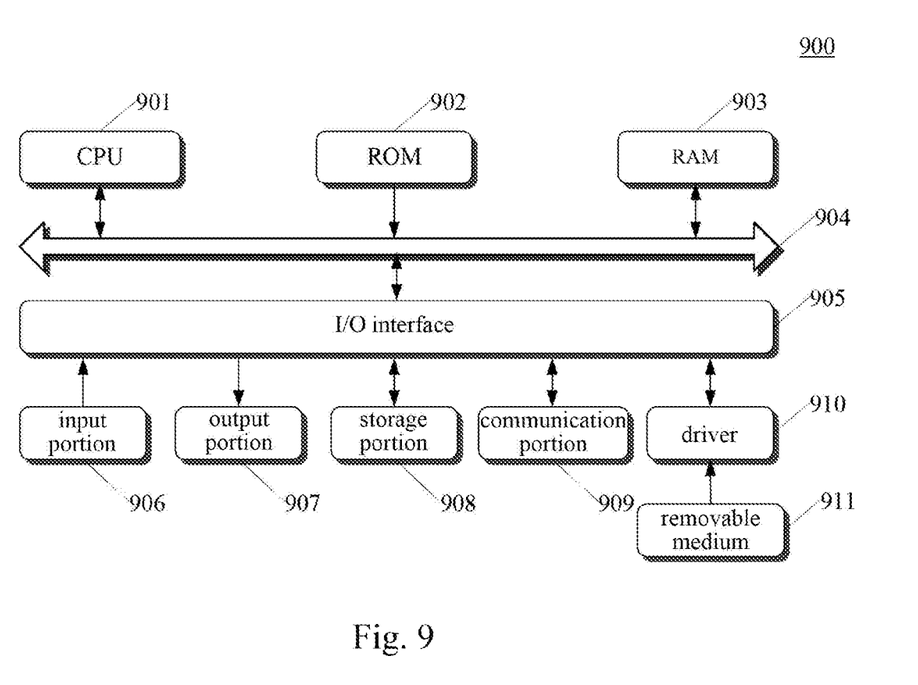
FIG. 9 is a schematic structural diagram of a computer system adapted to implement an electronic device according to the embodiments of the present disclosure.

Referring to FIG. 9, FIG. 9 is a schematic structural diagram of a computer system 900 adapted to implement an electronic device (e.g., the servers in FIG. 1) of the embodiments of the present disclosure. The electronic device shown in FIG. 9 is merely an example, and should not bring any limitations to the functions and the scope of use of the embodiments of the present disclosure.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 908. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse, etc.; an output portion 907 including a cathode ray tube (CRT), a liquid crystal display device (LCD), a speaker etc.; a storage portion 908 including a hard disk and the like; and a communication portion 909 including a network interface card such as a LAN (local area network) card and a modem. The communication portion 909 performs communication processes via a network such as the Internet. A driver 910 is also connected to the I/O interface 905 as required. A removable medium 911 such as a magnetic disk, an optical disk, a magneto-optical disk, and a semiconductor memory may be installed on the driver 910, to facilitate the retrieval of a computer program from the removable medium 911, and the installation thereof on the storage portion 908 as needed.

In particular, according to embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 909, and/or may be installed from the removable medium 911. The computer program, when executed by the central processing unit (CPU) 901, implements the above mentioned functionalities defined in the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising a connecting unit, a heartbeat writing unit, a heartbeat reading unit, a file writing unit and a first detecting unit. The names of these units do not in some cases constitute a limitation to such units themselves. For example, the connecting unit may alternatively be described as "a unit for connecting a database, in response to receiving a request for detecting the database."

In another aspect, the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: connect a database, in response to receiving a request for detecting the database; perform a write operation on a heartbeat table in the database, in response to detecting the connection with the database being normal; perform a read operation on the heartbeat table in the database, in response to detecting the write operation on the heartbeat table being abnormal; perform on the database an operation of writing a file to a hard disk, in response to detecting the read operation on the heartbeat table being normal; and output first information for representing a cause of a database failure, in response to detecting the operation of writing the file to the hard disk being abnormal.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for outputting information, comprising:
receiving a request for inspecting a MySQL database arranged in a server from a user by an instance agent arranged in the server;
connecting, in response to the request for inspecting the MySQL database arranged in the server, the MySQL database by the instance agent;
in response to the connecting between the instance agent and the MySQL database being normal, performing, by the instance agent, a write operation on a heartbeat table in the MySQL database;
in response to the write operation on the heartbeat table being abnormal, performing, by the instance agent, a read operation on the heartbeat table in the My SQL database;
in response to the read operation on the heartbeat table being normal, performing, by the instance agent, on the MySQL database an operation of writing a file to a hard disk;
in response to the connecting between the instance agent and the MySQL database being abnormal, determining whether a number of connections with the MySQL database is greater than a predetermined threshold;

in response to the number of connections with the MySQL database being greater than the predetermined threshold, performing, by the instance agent, on the MySQL database the operation of writing the file the hard disk; and in response to the operation of writing the file to the hard disk being abnormal, outputting, by the instance agent, first information for representing a cause of a database failure, wherein the first information indicates that the database failure is caused by failure of the hard disk.

2. The method according to claim 1, further comprising:
in response to the number of connections being less than the predetermined threshold, outputting second information for representing a cause of the database failure.

3. The method according to claim 1, further comprising:
in response to detecting that the read operation on the heartbeat table is abnormal, outputting third information indicating that the database failure is caused by a memory failure.

4. The method according to claim 1, further comprising:
acquiring master-slave synchronization status information of at least one slave MySQL database connecting with the MySQL database; and outputting fourth information for representing a cause of the database failure, in response to determining, based on the master-slave synchronization status information, that a ratio of slave My SQL databases master-slave connections thereof being interrupted to the at least one slave MySQL database exceeds a first predetermined ratio.

5. The method according to claim 4, further comprising:
in response to determining, based on the master-slave synchronization status information, that master-slave connections of some slave MySQL databases in the at least one slave MySQL database is uninterrupted, sending a request for re-establishing a connection with the MySQL database to slave MySQL databases having uninterrupted master-slave connections in the at least one slave MySQL database; and outputting the fourth information, in response to detecting that a ratio of slave MySQL databases having abnormal in re-establishing connections with the MySQL database to the slave MySQL database having an uninterrupted master-slave connection in the at least one slave MySQL database exceeds a second predetermined ratio.

6. The method according to claim 1, further comprising:
in response to detecting that the MySQL database is failed, acquiring a switching time when a previous operation of switching between MySQL databases is performed and remaining capacity of a candidate MySQL database; and switching the MySQL database to the candidate MySQL database, in response to determining that a difference between current time and the switching time is greater than or equal to a predetermined time interval threshold and the remaining capacity of the candidate MySQL database being greater than or equal to a used capacity of the MySQL database, wherein the performing a database switching operation includes:
sending switching indication information to an administrator terminal of the MySQL database; and
switching, in response to receiving switching confirmation information fed back by the administrator terminal, data in the MySQL database to the candidate MySQL database.

7. An apparatus for outputting information, comprising:
at least one processor; and
a memory storing instructions, the instructions when executed by the at least one processor, cause the at least one processor to perform operations, the operations comprising:

receiving a request for inspecting a MySQL database arranged in a server from a user by an instance agent arranged in the server;

connecting, in response to the request for inspecting the MySQL database arranged in the server, the MySQL database by the instance agent;

in response to the connecting between the instance agent and the MySQL database being normal, performing, by the instance agent, a write operation on a heartbeat table in the database;

in response to the write operation on the heartbeat table being abnormal, performing, by the instance agent, a read operation on the heartbeat table in the database;

in response to the read operation on the heartbeat table being normal, performing, by the instance agent, on the MySQL database an operation of writing a file to a hard disk;

in response to the connecting between the instance agent and the MySQL database being abnormal, determining whether a number of connections with the MySQL database is greater than a predetermined threshold;

in response to the number of connections with the MySQL database being greater than the predetermined threshold, performing, by the instance agent, on the MySQL database the operation of writing the file the hard disk; and in response to the operation of writing the file to the hard disk being abnormal, outputting, by the instance agent, first information for representing a cause of a database failure, wherein the first information indicates that the database failure is caused by failure of the hard disk.

8. The apparatus according to claim 7, wherein the operations further comprise:
in response to the number of connections being less than the predetermined threshold, outputting second information for representing a cause of the database failure.

9. The apparatus according to claim 7, wherein the operations further comprise:
in response to detecting that the read operation on the heartbeat table is abnormal, outputting third information indicating that the database failure is caused by a memory failure.

10. The apparatus according to claim 7, wherein the operations further comprise:
acquiring master-slave synchronization status information of at least one slave MySQL database connecting with the MySQL database; and outputting fourth information for representing a cause of the database failure, in response to determining, based on the master-slave synchronization status information, that a ratio of slave My SQL databases master-slave connections thereof being interrupted to the at least one slave MySQL database exceeds a first predetermined ratio.

11. The apparatus according to claim 10, wherein the operations further comprise:
in response to determining, based on the master-slave synchronization status information, that master-slave connections of some slave MySQL databases in the at least one slave MySQL database is uninterrupted, sending a request for re-establishing a connection with the MySQL database to slave MySQL databases having uninterrupted master-slave connections in the at least one slave MySQL database; and outputting the fourth information, in response to detecting that a ratio of slave MySQL databases having abnormal in re-establishing connections with the MySQL database to the slave database having an uninterrupted master-slave connection in the at least one slave MySQL database exceeds a second predetermined ratio.

12. The apparatus according to claim 7, wherein the operations further comprise:

in response to detecting that the MySQL database is failed, acquiring a switching time when a previous operation of switching between MySQL databases is performed and a remaining capacity of a candidate MySQL database; and switching the MySQL database to the candidate MySQL database, in response to determining that a difference between current time and the switching time is greater than or equal to a predetermined time interval threshold and the remaining capacity of the candidate MySQL database being greater than or equal to a used capacity of the MySQL database, wherein performing a database switching operation includes:

sending switching indication information to an administrator terminal of the MySQL database; and switching, in response to receiving switching confirmation information fed back by the administrator terminal, data in the MySQL database to the candidate MySQL database.

13. A non-transitory computer readable medium, storing a computer program, wherein the program, when executed by a processor, causes the processor to perform operations, the operation comprising:

receiving a request for inspecting a MySQL database arranged in a server from a user by an instance agent arranged in the server;

connecting, in response to the request for inspecting the MySQL database arranged in the server, the MySQL database by the instance agent;

in response to the connecting between the instance agent and the MySQL database being normal, performing, by the instance agent, a write operation on a heartbeat table in the MySQL database;

in response to the read operation on the heartbeat table being normal, performing, by the instance agent, a read operation on the heartbeat table in the MySQL database;

in response to the read operation on the heartbeat table being normal, performing, by the instance agent, on the MySQL database an operation of writing a file to a hard disk;

in response to the connecting between the instance agent and the MySQL database being abnormal, determining whether a number of connections with the MySQL database is greater than a predetermined threshold;

in response to the number of connections with the MySQL database being greater than the predetermined threshold, performing, by the instance agent, on the MySQL database the operation of writing the file the hard disk; and in response to the operation of writing the file to the hard disk being abnormal, outputting, by the instance agent, first information for representing a cause of a database failure, wherein the first information indicates that the database failure is caused by failure of the hard disk.

14. The medium according to claim 13, wherein the operations further comprise:

in response to the number of connections being less than the predetermined threshold, outputting second information for representing a cause of the database failure.

15. The medium according to claim 13, wherein the operations further comprise:

in response to detecting that the read operation on the heartbeat table is abnormal, outputting third information indicating that the database failure is caused by a memory failure.

* * * * *